S. DE PROCOUDINE-GORSKY.
PRODUCTION OF COLORED DIAPOSITIVES.
APPLICATION FILED JULY 17, 1919.
1,435,283.
Patented Nov. 14, 1922.
2 SHEETS—SHEET 1.
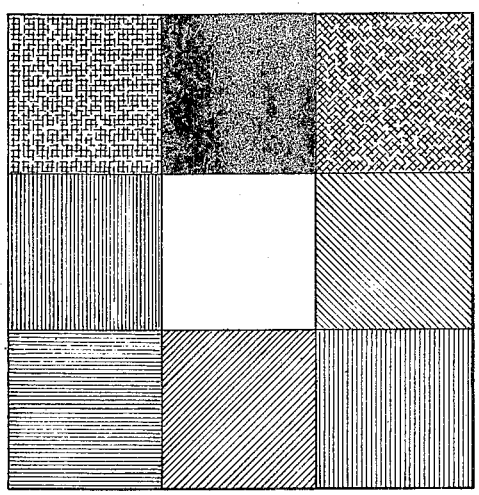
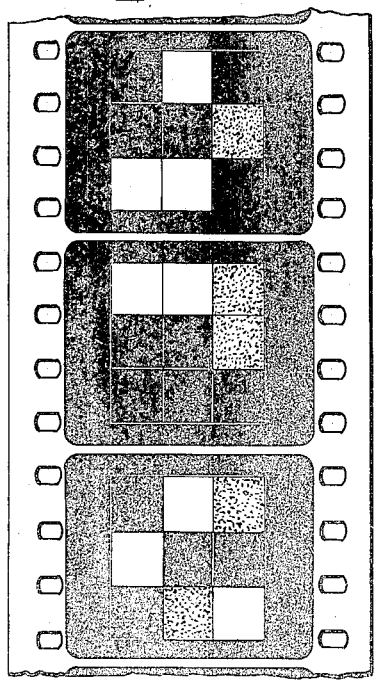
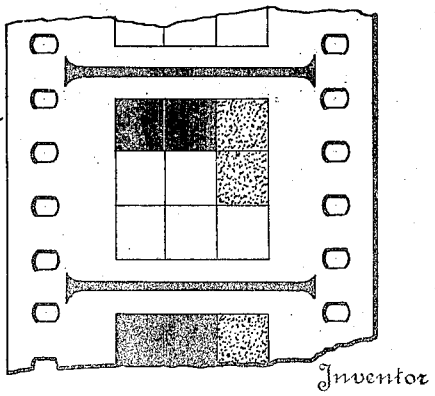

S. DE PROCOUDINE-GORSKY.
PRODUCTION OF COLORED DIAPOSITIVES.
APPLICATION FILED JULY 17, 1919.
1,435,283.
Patented Nov. 14, 1922.
2 SHEETS—SHEET 2.
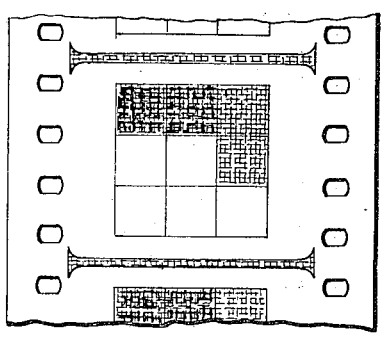
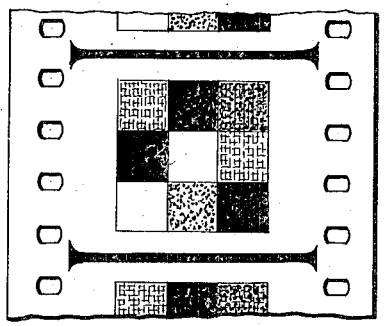
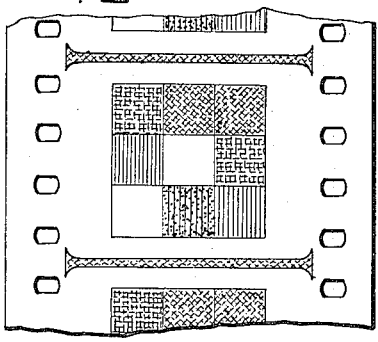
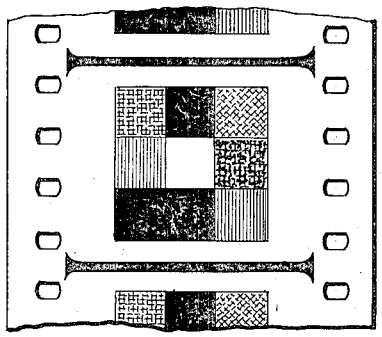
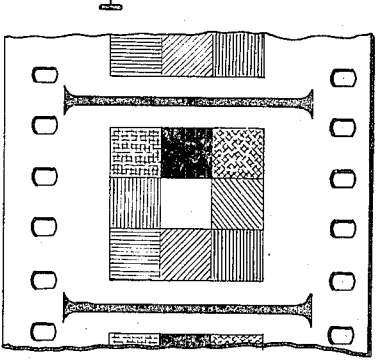
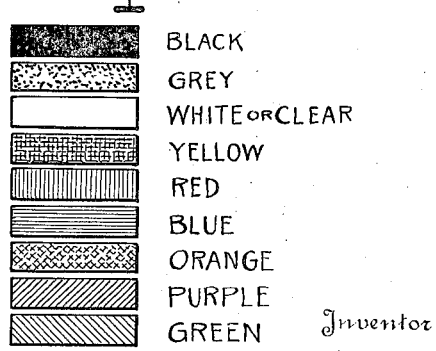

Patented Nov. 14, 1922.

1,435,283

UNITED STATES PATENT OFFICE.

SERGE DE PROCOUDINE-GORSKY, OF KONNERUD, NEAR DRAMMEN, NORWAY.

PRODUCTION OF COLORED DIAPOSITIVES.

Application filed July 17, 1919. Serial No. 311,684.

*To all whom it may concern:*

Be it known that I, SERGE DE PROCOUDINE-GORSKY, a Russian subject, residing at Granstad, Konnerud, near Drammen, Norway, have invented certain new and useful Improvements in the Production of Colored Diapositives; and I do hereby declare the following to be a full, clear, and exact description of the invention, such as will enable others skilled in the art to which it appertains to make and use the same.

This invention relates to the production of colored diapositives for use in magic lanterns or as kinematograph films and the like, and has for its object an improved method for the production of such diapositives.

For the production of colored diapositives the following two methods have usually been employed.

1. Three separate monochromatic pictures or films produced from three negatives taken through suitable color screens are brought into registration and are united by adhesion.

2. The transparent colored elements forming the color screens are attached to the emulsion support and coated with an emulsion. The emulsion is exposed through the color screen and the pictures obtained in the complementary colors by a photographic process are converted into pictures of the correct colors by suitable treatment.

These processes are expensive and are useless for the production of pictures on a large scale and may be considered more or less unsatisfactory for instantaneous or other high speed photography. Moreover, the diapositives obtained are of a low transparency and necessitate the use of high-power illuminants for optical projection purposes. Such diapositives, therefore, cannot be used, or can be used only to a limited extent, at places where illuminants of sufficiently high power are not available.

Generally speaking, the kinematograph films produced by the above and like methods are of undue thickness, and special optical means are required in order to avoid the disturbing influence of the thickness of the films and their support.

By the process of the present invention it is possible to produce at a low cost and on a manufacturing scale transparent colored diapositives for magic lanterns or for kinematographic exhibitions, the difficulties above referred to being avoided.

The process may be carried out according to the following procedure, reference being had to the accompanying drawings.

Figure 1 illustrates conventionally an object in its natural colors.

Figure 2 illustrates a portion of film containing three part negatives of the object shown in Figure 1 taken, respectively, through the orange, the violet-blue and the green color screens.

Figure 3 represents a black and white diapositive from the negative taken through the violet-blue color screen.

Figure 4 represents the diapositive of Figure 3 converted to yellow.

Figure 5 represents the diapositive of Figure 4 with a black and white print of the negative taken through the green color screen superposed thereon.

Figure 6 represents the diapositive of Figure 5 converted to red.

Figure 7 represents the diapositive of Figure 6 with a black and white print of the negative taken through the orange color screen superposed thereon.

Figure 8 represents the diapositive of Figure 7 converted to blue.

Figure 9 represents a color scale.

In Figs. 2 to 8, inclusive, the effect of light has been indicated by solid black or white or stippling, the solid black indicating where a practically opaque silver deposit appears in the negative or positive, the white spaces indicating where there is practically no silver deposit and the stippled portions indicating where there is silver deposit less than sufficient to produce opacity. The portions which are shaded for color indicate the colors which have been produced by dying the film and the different colors can be identified by reference to Fig. 9.

According to this process a colored diapositive is produced from three negative members corresponding to the three primary colors selected, the individual negative members being preferably used in the following way:—

From one of the three negative members, for instance, the one representing the object of Figure 1 taken through the violet-blue color screen, an ordinary black and white diapositive is printed, as represented in Figure 3. The silver of this diapositive is converted into a lac-like and completely transparent image by means of a yellow color in a known manner, for instance, by converting the metallic silver into silver iodide and partly into silver sulphocyanide, coloring and fixing. The resulting image is illustrated in Figure 4. Upon this image, when the coating has dried, is poured a positive emulsion and upon this emulsion is printed a black and white diapositive from the negative taken through the green color screen, the image being printed in exact register with the first image. After the second diapositive has been developed, the treatment described in connection with the first diapositive is repeated, but with the difference that a red color is employed. Thereupon a positive emulsion is poured upon the surface and the coating is allowed to dry, a black and white diapositive from the negative taken through the orange color screen printed and the image treated with a blue color.

In this manner there are produced exactly registering images which together reproduce the photographed object in its natural colors, and a composite diapositive is thus obtained, which, owing to the thin emulsion coatings and to the properties of the lac colors, is distinguished by a very high degree of transparency, so that its exhibition is possible even by the use of a very weak source of light.

Thus the present process may be said to be characterized by the fact that in the production of colored diapositives a direct covering with the positive emulsion is made use of instead of uniting different sheets or films by means of gluing them together or in other ways. The process is of great practical consequence because it affords an exceedingly thin and transparent film, which does not scale under the action of the light which, as known, is liable to take place when the known methods are made use of in which the film members are united by mechanical means.

When suitable apparatus is employed for facilitating the registering of the negative images, the coloring of the images, the application of the positive emulsion coatings, etc., then this novel method for the production of colored diapositives for magic lanterns and for kinematograph picture films can be carried into effect in a simple manner and quickly, lasting and inexpensive products produced on a manufacturing scale being obtained.

Having now described my invention:—
What I claim is:—

The herein-described process of producing colored diapositives from three negatives each representing the same object taken through one of three selective primary color screens, which comprises printing a black diapositive from the first negative, converting said diapositive into a color positive of a color complementary to that of the screen through which the corresponding negative was taken, coating said color positive with a positive emulsion, printing on said coating a black diapositive from the second negative, converting said diapositive into a color positive of a color complementary to that of the screen through which the second negative was taken, coating said color positive with a positive emulsion, printing on said coating a black diapositive from the third negative, and converting said diapositive into a color positive of a color complementary to that of the screen through which the third negative was taken.

In testimony that I claim the foregoing as my invention, I have signed my name in presence of two subscribing witnesses.

SERGE de PROCOUDINE-GORSKY.

Witnesses:
OLGA MÜLLER,
MOQUIST BÜGGE.